(12) United States Patent
McConnell et al.

(10) Patent No.: US 7,249,708 B2
(45) Date of Patent: Jul. 31, 2007

(54) HOUSEHOLD MANAGEMENT SYSTEMS AND METHODS

(75) Inventors: Thoedore Van Fossen McConnell, Cincinnati, OH (US); Jason Edward Springer, Cincinnati, OH (US); Terrence Paul McFadden, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 97 days.

(21) Appl. No.: 11/051,951

(22) Filed: Feb. 4, 2005

(65) Prior Publication Data

US 2006/0175403 A1   Aug. 10, 2006

(51) Int. Cl.
G06K 15/00   (2006.01)

(52) U.S. Cl. ..................... 235/383; 235/380

(58) Field of Classification Search ............... 235/383, 235/381, 382, 380, 375, 492, 493; 705/39, 705/78, 26
See application file for complete search history.

(56) References Cited

U.S. PATENT DOCUMENTS

| | | | |
|---|---|---|---|
| 5,544,040 A | 8/1996 | Gerbaulet | |
| 5,673,691 A | 10/1997 | Abrams et al. | |
| 5,825,002 A | 10/1998 | Roslak | |
| 5,841,115 A | 11/1998 | Shepley | |
| 5,870,473 A * | 2/1999 | Boesch et al. | 705/78 |
| 5,870,716 A | 2/1999 | Sugiyama et al. | |
| 5,960,440 A | 9/1999 | Brenner et al. | |
| 5,966,697 A | 10/1999 | Fergerson et al. | |
| 5,970,469 A | 10/1999 | Scroggie et al. | |
| 6,014,634 A | 1/2000 | Scroggie et al. | |
| 6,032,129 A | 2/2000 | Greef et al. | |
| 6,055,573 A | 4/2000 | Gardenswartz et al. | |
| 6,084,528 A | 7/2000 | Beach et al. | |
| 6,185,541 B1 | 2/2001 | Scroggie et al. | |
| 6,246,997 B1 | 6/2001 | Cybul et al. | |
| 6,246,998 B1 | 6/2001 | Matsumori | |
| 6,249,773 B1 | 6/2001 | Allard et al. | |
| 6,298,330 B1 | 10/2001 | Gardenswartz et al. | |
| 6,307,958 B1 | 10/2001 | Deaton et al. | |
| 6,317,722 B1 | 11/2001 | Jacobi et al. | |

(Continued)

FOREIGN PATENT DOCUMENTS

GB   2368928 A   5/2002

(Continued)

OTHER PUBLICATIONS

"Customer's personal account. Shopping history", Articus Consulting (Copyright 2004), http://www.shop-script.com/f-history.html, Date visited—Jul. 22, 2004.

(Continued)

*Primary Examiner*—Thien Minh Le
(74) *Attorney, Agent, or Firm*—Leonard W. Lewis

(57) ABSTRACT

A household management system having a user interface, a media content data store, a purchase history data store, a media content manager in communication with the user interface and the media content data store, and a purchase history module in communication with the user interface and the purchase history data store. A method of selectively displaying media content to a consumer, and a computer-implemented method of populating a shopping list comprising a list of a plurality of products for later purchase by a user are also provided.

20 Claims, 8 Drawing Sheets

U.S. PATENT DOCUMENTS

| | | |
|---|---|---|
| 6,321,208 B1 | 11/2001 | Barnett et al. |
| 6,321,210 B1 | 11/2001 | O'Brien et al. |
| 6,386,450 B1 | 5/2002 | Ogasawara |
| 6,466,915 B1 | 10/2002 | Suzuki et al. |
| 6,484,146 B2 | 11/2002 | Day et al. |
| 6,484,149 B1 | 11/2002 | Jammes et al. |
| 6,513,017 B1 | 1/2003 | Howard et al. |
| 6,560,578 B2 | 5/2003 | Eldering |
| 6,595,417 B2 | 7/2003 | O'Hagan et al. |
| 6,678,685 B2 | 1/2004 | McGill et al. |
| 6,684,195 B1 | 1/2004 | Deaton et al. |
| 6,718,310 B1 | 4/2004 | Fuisz et al. |
| 6,735,778 B2 | 5/2004 | Khoo et al. |
| 7,062,452 B1 * | 6/2006 | Lotvin et al. ......... 705/26 |
| 2001/0013011 A1 | 8/2001 | Day et al. |
| 2001/0032128 A1 | 10/2001 | Kepecs |
| 2002/0016734 A1 | 2/2002 | McGill et al. |
| 2002/0026380 A1 | 2/2002 | Su |
| 2002/0050526 A1 | 5/2002 | Swartz et al. |
| 2002/0072974 A1 | 6/2002 | Pugliese, III et al. |
| 2002/0116260 A1 | 8/2002 | Szabo et al. |
| 2002/0120496 A1 | 8/2002 | Scroggie et al. |
| 2002/0120534 A1 | 8/2002 | Howard et al. |
| 2002/0130902 A1 | 9/2002 | Shaouy et al. |
| 2002/0147642 A1 | 10/2002 | Avallone et al. |
| 2002/0161658 A1 | 10/2002 | Sussman |
| 2002/0174021 A1 | 11/2002 | Chu et al. |
| 2003/0004831 A1 | 1/2003 | Owens |
| 2003/0105682 A1 | 6/2003 | Dicker et al. |
| 2003/0105719 A1 | 6/2003 | Berger et al. |
| 2003/0130897 A1 | 7/2003 | Pickover et al. |
| 2003/0132298 A1 | 7/2003 | Swartz et al. |
| 2003/0139969 A1 | 7/2003 | Scroggie et al. |
| 2003/0139976 A1 | 7/2003 | Hanai et al. |
| 2003/0171944 A1 | 9/2003 | Fine et al. |
| 2003/0172005 A1 | 9/2003 | Hellal et al. |
| 2003/0204412 A1 | 10/2003 | Brier |
| 2004/0044584 A1 | 3/2004 | Chung |
| 2004/0049422 A1 | 3/2004 | Mortimer |
| 2004/0049434 A1 | 3/2004 | Khoo et al. |
| 2004/0083131 A1 | 4/2004 | Kaufman et al. |
| 2004/0093274 A1 | 5/2004 | Vanska et al. |
| 2004/0116780 A1 | 6/2004 | Brown |
| 2004/0117249 A1 | 6/2004 | Wang et al. |
| 2004/0117270 A1 | 6/2004 | Sugahara |
| 2004/0117301 A1 * | 6/2004 | Fujisawa et al. ......... 705/39 |
| 2006/0085289 A1 * | 4/2006 | Lotvin et al. ......... 705/26 |

FOREIGN PATENT DOCUMENTS

| | | |
|---|---|---|
| WO | 02/37366 A2 | 5/2002 |
| WO | 2004/042491 A2 | 5/2004 |

OTHER PUBLICATIONS

Rafe Needleman, "Online Shopping From Aisle Four" (Apr. 10, 2003), Ralph Needleman's What's Next, http://www.business2.com.

"Shopping Help", Ouidad (copyright 2004), http://www.ouidad.com/menu_00/customercare_help.asp., Date visited—Jul. 22, 2004.

"IBM personal shopping assistant", IBM, http://www-1.ibm.com/industries/retail/doc/content/solutions/1017031101.html, Date visited—Jul. 22, 2004.

"Demo pages: Shopping History & orders dispatched", ican online, http://www.icanonline.co.za/marketing/shop/shopping_history_demo.asp, Date visited—Jul. 22, 2004.

Margot Ross, User Guide: tkc Shopper—Grocery list management, theKompany.com (copyright 2004).

Overview: tkc Shopper—Grocery list management, theKompany.com (copyright 2004).

"Create a Shopping List", Giant Eagle, Inc. (copyright 1997-2004; http:/www.gianteagle.com/main/goshopping.jsp, Date visited—Jul. 22, 2004.

"Chef's Accountant—Recipe Management", http://www.dynacompsofware.com/ebay/91-37.htm, Date visited—May 6, 2004.

"New Shopping carts may talk to you" (Oct. 29, 2003), CNN.com, The Associated Press (copyright 2003), http://www.cnn.com/2003/TECH/ptech/10/29/shoo.future/ap/, Date visited—May 7, 2004.

"Case Studies: STAT Pharmaceuticals", Business OL, Inc. (copyright 2004), http://www.businessol.com/case_studies/state.htm, Date visited—May 7, 2004.

"Case Studies", Cuesole (Copyright 2003), http://www.cuesol.com/company/customers/case-studies/, Date visited—May 7, 2004.

Duvall, et al., "Baseline—A Shot at The Crown" (Feb. 2004), www.Baselinemag.com, Issue 027.

"Linking Convenience Retail Marketers With their Customers", Peoplinx (Copyright 2002), http://www.peoplinz.net/cgi-win/PLXCorpoWebDrvr.exe/Product, Date Visited—Jun. 14, 2004.

Michelle Higgins, "Grocery Shopping Enters a New Age" (Mar. 30, 2004), Wall Street Week, http://www.mindfully.org/Technology/2004/Grocery-New-Age30mar04.htm, Date visited—May 6, 2004.

* cited by examiner

HOUSEHOLD MANAGEMENT SYSTEMS AND METHODS

RELATED APPLICATIONS

None.

FIELD OF THE INVENTION

The present invention relates to household management systems and methods, some of which utilize individual shopping histories.

BACKGROUND OF THE INVENTION

Many retailers such as grocery store chains offer loyalty card programs. Typically, a customer that signs up for the program will provide personal information, including household demographic data, to the retailer. In exchange, the customer will receive an identification card or other device which identifies that customer as a participant in the loyalty program.

During the checkout process at one of the retailer's stores, the customer will present their loyalty card (or other device) so that details of their transaction can be linked to the customer for later use by the retailer. For example, the loyalty card can comprise a card containing a bar code and/or a magnetic strip which is read by a point-of-sale device (e.g., a cash register system) in order to identify the customer by, for example, an unique loyalty program identification number read from the loyalty card.

In exchange for participating in the loyalty program, the customer may typically receive product discounts which are only available to program participants. In some instances, incentives may be presented to the customer at checkout, such as in the form of one or more coupons printed on the back of the customer's receipt. The customer may redeem the coupon(s) upon their next visit to the store. In other instances, a retailer or manufacturer may send an incentive (e.g., a coupon) to the customer (e.g., via postal mail or electronic mail) for later redemption. In both of these types of promotional activities, the incentive is presented to the consumer at a time when they are typically not making purchasing decisions, thus reducing the effectiveness of these types of promotions.

Loyalty card programs do not allow customer's to access their own shopping histories. Instead, retailers and manufacturers will use the shopping history data for their own internal purposes and to target various incentives (e.g., coupons) to particular customers based upon their shopping histories, demographics and/or various other factors. The retailer or manufacturer benefits in that they can target promotional activities to certain customers, and can even evaluate the success of their promotional activities based on the subsequent purchasing behavior of the targeted customers. In addition, loyalty programs can generate a wealth of data related to consumer behavior and purchasing habits—information that the retailer may even sell to other retailers or manufacturers.

SUMMARY OF THE INVENTION

Some embodiments of the present invention provide a household management system, comprising: (a) a user interface; (b) a media content data store containing a plurality of media content items and at least one rule associated with each media content item; (c) a purchase history data store containing purchase history data identifying past purchases of a system user; (d) a media content manager in communication with the user interface and the media content data store, the media content manager comprising executable instructions for selecting at least one of the media content items for presentation to a user based on the rules; and (e) a purchase history module in communication with the user interface and the purchase history data store, the purchase history module comprising executable instructions for selectively displaying purchase history data in response to user instructions. In one embodiment, the media content data store and the purchase history data store are provided on a personal computer.

This system may further comprise a product catalog data store containing product information for products available for purchase from at least one retailer, and a shopping list module comprising executable instructions for generating a shopping list comprising a list of products for later purchase, the shopping list module in communication with the user interface and the product catalog data store. The system may also include a pantry inventory data store containing data identifying the current inventory of one or more products in a user's household, and a pantry inventory manager in communication with the pantry inventory data store and the purchase history data store. The pantry inventory manager may comprise executable instructions for updating the pantry inventory data store based on the purchase history data.

A recipe data store containing a plurality of recipes may also be provided, as well as a recipe module in communication with the user interface and the recipe data store, The recipe module may comprise executable instructions for selecting at least one recipe from the recipe data store in response to user input. Similarly, a meal planning module in communication with the user interface, the pantry inventory data store, and the recipe data store may also be included, wherein the meal planning module comprising executable instructions for generating a meal plan based on the inventory data and the recipes.

Systems of the present invention may also include a diet/nutrition manager in communication with the user interface and the product catalog data store, wherein the diet/nutrition manager comprises executable instructions for recommending products to a user based on one or more diet/nutrition parameters selected by a user. The systems of the present invention may also include stored household demographic data, and the media content manager may include executable instructions for selecting at least one of the media content items for presentation to a user based on at least one of: household demographic data, purchase history data, pantry inventory data, a shopping list, a selected recipe, a meal plan and a diet/nutrition parameter. The systems of the present invention may further be configured to receive purchase history data from a remote server and store received purchase history data in the purchase history data store. The systems may also be configured to transmit to a remote server data indicative of media content items presented to a user.

Embodiments of the present invention also provide a method of selectively displaying media content to a consumer, comprising: (a) receiving media content data from a remote computer over a computer network and storing the media content data on a personal computer, the media content data stored on the personal computer including a plurality of media content items and at least one rule associated with each media content item; (b) selecting one of the media content items stored on the personal computer based on the rules; and (c) displaying the selected media content item to the consumer on a display device associated with the personal computer.

In this method, the selecting step may comprises comparing the rules to household data stored on the personal computer, the household data comprising at least one of: household demographic data, purchase history data, pantry inventory data, a shopping list, a selected recipe, a meal plan and a diet/nutrition parameter. The methods of the present invention may also comprise the steps of receiving purchase history data identifying past purchases of the consumer from a remote computer over a computer network; and storing the purchase history data on the personal computer, wherein the selecting step comprises comparing the rules to the purchase history data.

Methods of the present invention may also include the steps of providing a pantry inventory data store containing data identifying the current inventory of one or more product's in the consumer's household, and updating the pantry inventory data store on the basis of the purchase history data. Other steps may include generating a shopping list containing at least one product for later purchase by the consumer.

With respect to media content and the methods of the present invention, each of the media content items may comprise information related to a product available for purchase by the consumer. The methods of the present invention may further comprise the steps of, after the step of displaying a selected media content item, receiving an instruction input into the personal computer to add to the shopping list the product to which the displayed media content item is related, and transmitting to a remote server data indicating that the product to which the displayed media content item is related was added to the shopping list.

The present invention also provides a computer-implemented method of populating a shopping list comprising a list of a plurality of products for later purchase by a user. This method may comprise (a) providing a purchase history data store containing purchase history data identifying past purchases of a user; (b) providing a product catalog data store containing product information for products available for purchase from at least one retailer; (c) providing a pantry inventory data store containing data identifying the current inventory of one or more products in the user's household; (d) creating a new shopping list in response to user input; (e) populating the new shopping list with one or more products selected on the basis of at least one of the purchase history data and the pantry inventory data; (f) receiving user input identifying one or more products selected from the product catalog data store by the user; and (g) populating the new shopping list with the one or more products selected by the user. This method may also comprise the steps of providing a recipe data store containing a plurality of recipes; receiving user input identifying at least one recipe selected by the user from the recipe data store; and populating the new shopping list with the one or more products comprising ingredients of a selected recipe which are not identified in the pantry inventory data store in sufficient quantity for preparation of the selected recipe.

The method of populating a shopping list may also comprise the steps of providing a shopping list data store containing one or more shopping lists previously-created shopping lists; receiving user input identifying at least one product selected by the user from a previously-created shopping list; and populating the new shopping list with the at least one product selected from a previously-created shopping list. This method may also include the steps of receiving user input identifying one or more diet/nutritional parameters selected by the user; selecting at least one alternative product for a product in the new shopping list on the basis of the at least one diet/nutritional parameters, the alternative product selected from the product catalog data store; and displaying the selected alternative product to the user. The product catalog data store may include nutritional information for products included therein, and the selecting step may comprise comparing nutritional information for a product in the new shopping list and one or more alternative products in the product catalog data store to the at least one diet/nutritional parameters in order to identify at least one alternative product which better satisfies the at least one diet/nutritional parameters than the product in the new shopping list. The shopping list may also be transmitted to a remote server.

Yet another embodiment of the present invention provides a household management system, comprising: (a) a media content data store containing a plurality of media content items and at least one rule associated with each media content item; (b) a purchase history data store containing purchase history data identifying past purchases of a system user; (c) a product catalog data store containing product information for products available for purchase from at least one retailer; (d) a purchase history module in communication with the purchase history data store, the purchase history module comprising executable instructions for selectively displaying purchase history data in response to user instructions; (d) a shopping list module comprising executable instructions for generating a shopping list comprising a list of products for later purchase from the at least one retailer, the shopping list module in communication with the product catalog data store and the purchase history data store; and (e) a media content manager in communication the media content data store, the media content manager comprising executable instructions for selecting at least one of the media content items for presentation to a user based on the rules, and for determining the success of the at least one media content item based on a shopping list generated by the shopping list module.

Embodiments of the present invention also provide computer readable media which is programmed according to the teachings of the present invention, and/or for providing the data stores and stored data discussed herein.

The present invention also provides a household management system which includes: (a) a product catalog data store containing product information for products available for purchase from at least one retailer; (b) a media content data store containing a plurality of media content items, the media content items associated with one or more products for which product information is contained in the product catalog data store; (c) a diet/nutrition manager in communication with the product catalog data store, the diet/nutrition manager comprising executable instructions for recommending products from the product catalog data store to a user based on one or more diet/nutrition parameters selected by a user; and (d) a media content manager in communication the media content data store, the media content manager comprising executable instructions for selecting at least one of the media content items for presentation to a user based on products recommended by the diet/nutrition manager. By way of example, the media content items may include a product coupon which the user may print and take with them to a retailer for redemption. Alternatively, or in addition thereto, media content items may include promotional information or other information related to a product which the user may purchase from a retailer.

The household management system may also include: a purchase history data store containing purchase history data identifying past purchases of a system user; a pantry inventory data store containing pantry inventory data identifying the current inventory of one or more products in a user's household; and a pantry inventory manager in communication with the pantry inventory data store and the purchase history data store, the pantry inventory manager comprising executable instructions for updating the pantry inventory data store based on the purchase history data. The media content manager may comprise executable instructions for selecting at least one of the media content items for presentation to a user based on the pantry inventory data (e.g., when the pantry inventory data indicates that a product with which a media content item is related is below a predetermined level). The household management system may also include a shopping list module comprising executable instructions for generating a shopping list comprising a list of products for later purchase from the at least one retailer, the shopping list module in communication with the product catalog data store, the purchase history data store, the diet/nutrition manager and the pantry inventory data store.

BRIEF DESCRIPTION OF THE DRAWINGS

FIGS. 2-8 are exemplary screen shots depicting a graphical user interface 50 according to one embodiment of the present invention.

DETAILED DESCRIPTION OF THE INVENTION

Figure 1:
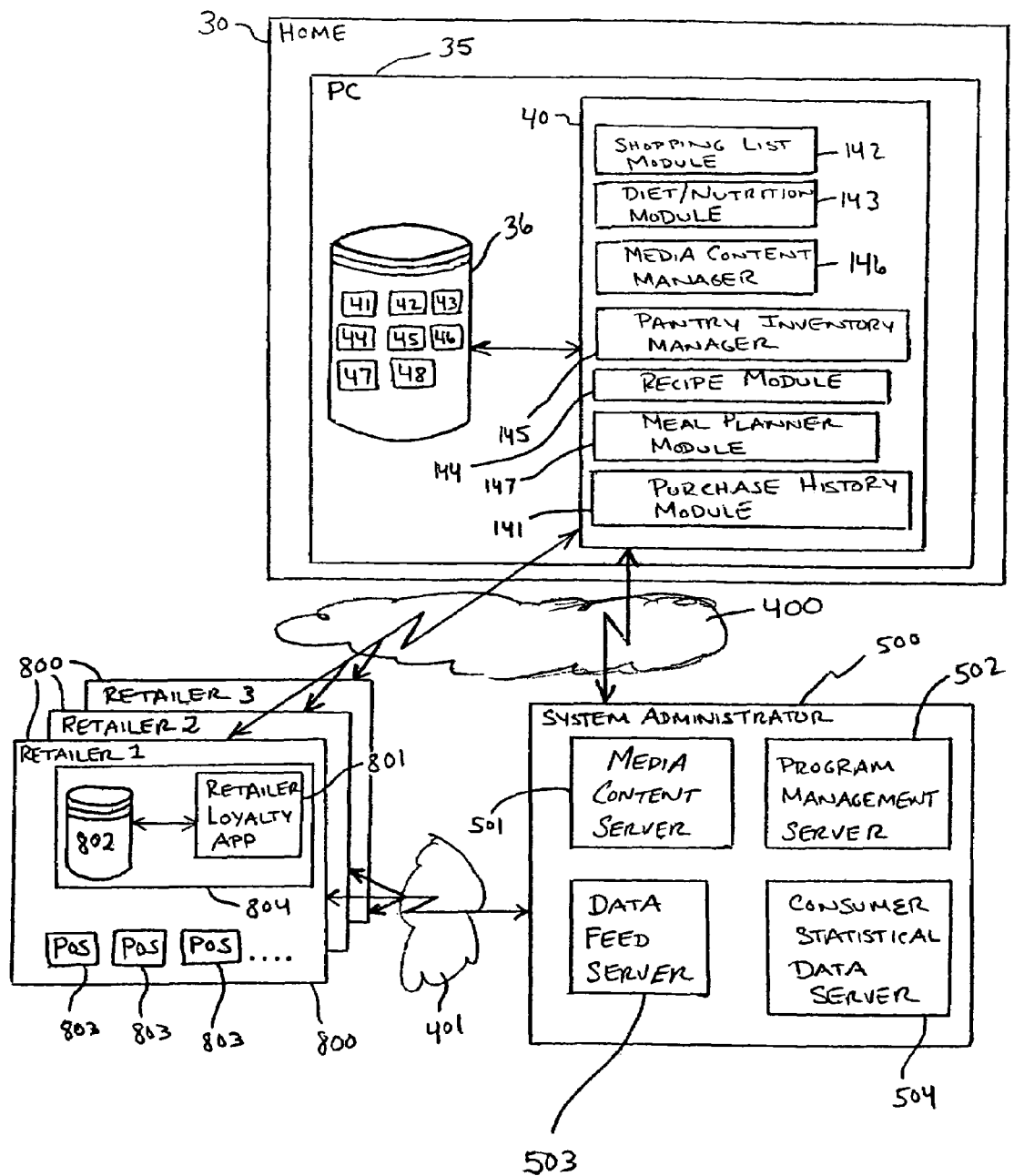
FIG. 1 is a schematic illustration of a household management system according to one embodiment of the present invention.

The present invention provides computer-implemented household management systems and methods. Some embodiments allow consumers to utilize their own personal shopping histories for a variety of purposes, such as generating shopping lists. Other embodiments provide systems and methods for displaying media content to a consumer. The household management systems and methods of the present invention may include a number of features, such as a shopping list generator, diet and nutritional information and assistance, a recipe assistant, a meal planner, a pantry inventory manager and/or media content (e.g., targeted advertising and promotions). In addition, some embodiments allow the consumer to utilize their own purchase histories for purposes such as household budgeting and the tracking of purchasing activities.

In some embodiments, retailers and manufacturers benefit in that they can selectively target their advertising and promotions to consumers at the time the consumer is preparing a shopping list (i.e., at the moment they are making purchasing decisions). In addition, the success of such advertising and promotions can be evaluated based on whether or not the consumer adds a particular item to their shopping list. In fact, the cost to a retailer or manufacturer wishing to target media to consumers using the system (e.g., advertising or promotions) can be based upon shopping list data—e.g., how many consumers add an item to their shopping list after receiving the targeted advertising or promotions.

The systems and methods of the present invention will be described in conjunction with exemplary embodiments shown in the drawings. As further described herein, these systems and methods may be implemented in a variety of ways in addition to that shown in the drawings.

FIG. 1 depicts an exemplary embodiment of a household management system according to the present invention, wherein the consumer's purchase histories and media content are stored locally (i.e., on a computing device associated with the consumer or the consumer's household). In other embodiments of the present invention, the consumer's purchase histories and/or media content may not be stored locally. In FIG. 1, a personal computer 35 (e.g., a PC located at a consumer's home 30) includes a household management application 40 and one or more local data stores 36 interfaced therewith. Household management application 40 may comprise one or more sets of executable instructions for performing the various steps and methods described herein.

As used herein, the term "personal computer" (or "PC") refers to a computer associated with a particular user or a particular user's household, rather than a centralized server or other computer system which processes or stores data for a plurality of users or households. However, the term "personal computer" is not limited to traditional desktop computers. Rather, "personal computer" generally includes any computing device having a CPU, memory, a visual display device (e.g., a display screen, a printer, etc.), and an input device (e.g., a keyboard, mouse, touch sensitive screen, etc,). By way of example, a personal computer may include a desktop PC, a notebook PC, a tablet PC, a personal digital assistant (PDA), a wireless computing device such as a cell phone or automobile computer, an interactive TV, an Internet appliance, or the like.

Data stores 36 may include a purchase history data store 41, a shopping list data store 42, a diet/nutrition data store 43, a recipe data store 44, a pantry inventory data store 45, a media content data store 46, a product catalog data store 47 and a household profile data store 48. As is known to those skilled in the art, each of these data stores may be combined into one or any number of data stores, including one or more integrated databases or memory areas in PC 35.

The information stored in each of the data stores may also be cross-referenced with the information in one or more of the other data stores. For example, nutritional information contained in diet/nutrition data store 43 may be cross-referenced with product catalog data store 47 so that nutritional information for each food item in product catalog 47 may be retrieved from diet/nutrition data store 43. This may be accomplished, for example, by using a common identifier (e.g., an UPC code) for product information stored in diet/nutrition data store 43 and product catalog store 43 (and any other data stores containing product-related information). As also shown in FIG. 1, household management application 40 interfaces with each of the data stores such that information may be retrieved from, and stored in each of the data stores, as needed.

Household management application 40 may be configured to communicate with one or more system administrator servers (e.g., 501-504) located at one or more system administrator sites 500 which are remote from the consumer's home 30. Household management application 40 may also communicate, either directly or indirectly, with one or more retailer loyalty applications 801 located at one or more retailer sites 800 which are also remote from the consumer's home 30. Such communication between household management application 40 and system administrator servers 501-504 and retailer loyalty applications 801 may take place over a communications network 400, such as the Internet. Similarly, one or more of the system administrator servers, such as data feed server 503 or consumer statistical data server

504, may also communicate with retailer loyalty application 801 over a communications network 401 which may be the same as or different from communications network 400. Communications networks 400 and/or 401 may alternatively comprise a local area network (LAN), a wide area network (WAN), or an intranet.

Household management application 40 may be configured to retrieve the consumer's shopping history from one or more retailers 800 by communicating directly with each retailer loyalty application 801 (e.g., over communications network 400). Alternatively, household management application 40 may be configured to retrieve the consumer's shopping history from data feed server 503 or consumer statistical data server 504 (or any of the other system administrator servers 501-504), particularly when data feed server 503 or statistical data server 504 is configured such that is has previously retrieved and stored the consumer's shopping history from one or more retailers 800. In this manner, data feed server 503 or statistical data server 504 may act as a central storage repository for purchase history data for multiple consumers and multiple retailers, and may be configured to periodically retrieve such data from one or more retailers 800. It should also be pointed out that each of the system administrator services may comprise individual stand-alone computer servers, or multiple server or sever components integrated over a network.

As yet another alternative, data feed server 503 or statistical data server 504 may be configured to only retrieve a customer's shopping history upon receiving an update request from household management application 40. In such an embodiment, data feed server 503 or statistical data server 504 essentially acts merely as a conduit for the transmission of purchase history data to household management application 40, and the purchase history data may or may not be stored on data feed server 503 or statistical data server 504.

Each consumer's shopping history (or purchase history) is typically stored in a retailer data store 802 which communicates with a retailer loyalty application 801. Each retailer 800 (e.g., a grocery store chain) may have multiple retail locations (e.g., individual grocery stores), and therefore shopping history information may be communicated from each retail location to retailer data store 802. In an exemplary embodiment, retailer data store 802 and retailer loyalty application 801 may be provided as part of a centralized retailer server 804.

By way of example, many retailers such as grocery store chains have customer loyalty programs which compile consumer shopping histories and provide various incentives to consumers based upon their shopping histories. Typically, a consumer will be provided with a loyalty program identification card or other device the consumer presents upon checkout at the store. The loyalty card or other identification device is typically used by a point-of-sale ("POS") device 803 to identify the customer and link the details of that particular transaction to the customer.

Following checkout, the transaction data from POS device 803 may be transmitted to retailer server 804 where the transaction data is stored in retailer data store 802 for later retrieval, analysis and use. This transaction data will generally include an identifier for the customer (e.g., their loyalty card number), the transaction date, an identifier for the store (e.g., a store number) and details regarding each of the items purchased. The purchased item detail may include a product identification code (e.g., an UPC code), the quantity purchased, the price for each item, and any discounts applied to that item (e.g., redeemed coupons). The purchased item detail may also include specific information identifying each particular discount applied to a particular item (e.g., the UPC code or other identifier for a redeemed coupon). As is typically the case with retailer loyalty programs, the customer shopping histories may be stored in a centralized retailer data store 802 such that a particular customer's shopping history may be retrieved therefrom (e.g., by querying the data store using the customer's loyalty program identification number or other alphanumeric code identifying the customer).

In the systems and methods of the present invention, the shopping history retrieval process may be initiated in a variety of manners. For example, household management application 40 may be configured to communicate with each retailer loyalty application 801 on a regularly scheduled basis, such as every night at a particular time chosen by the user. In this manner, the user (i.e., the consumer) may schedule data acquisition at a time which does not interfere with use of computer 35 for other purposes. This is also true for communications with the system administrator servers 501-504—which may, in fact, be similarly scheduled to occur on a regular basis, even at the same time as scheduled communication with each retailer loyalty application 801. Alternatively, communication with each retailer loyalty application 801 and system administrator application 501 may be user-prompted. For example, the consumer may input an update command to household management application 40 (e.g., by clicking on an "Update" icon displayed in a graphical user interface). As yet another alternative, household management application 40 may be configured to automatically communicate with each retailer loyalty application 801 and/or the system administrator servers 501-504, such as each time the user opens (i.e., runs) household management application 40.

Regardless of the manner in which such communication is initiated, household management application 40 may transmit one or more unique identifiers for the consumer, such as the consumer's loyalty card identifier and password, to one or more retailers 800 (e.g., a server 804 associated with each retailer) and/or one or more of the system administrator servers. Retailer loyalty application 801 (and/or system administrator servers, such as data feed server 503) will verify the consumer's loyalty card identifier and password (e.g., by comparing the identifier and password to a data store containing such customer information), and then transmit the consumer's shopping history back to household management application 40 for storage in purchase history data store 41. In one exemplary embodiment, any portion of the consumer's shopping history not previously sent to household management application 40 will be transmitted. In this manner, the system will simply update the consumer's shopping history locally (i.e., on the consumer's computer 35) with any transactions (i.e., purchases) since the last update.

During the update process, household management application 40 may also transmit the consumer's identification (e.g., system ID assigned to that consumer or the consumer's loyalty card identifier) and password to one or more of the system administrator servers 501-504. This may occur before, simultaneously with, or after communication with retailer loyalty applications 801. In response, the system administrator server(s) may transmit application updates and household management data back to household management application 40. Application updates may include, for example, modifications, enhancements, bug fixes, and other updates for household management application 40. Household management data may include additions, deletions, updates and other modifications for diet/nutrition data store 43, recipe data store 44, media content data store 46 and/or product catalog data store 47. As further described herein, household management application 40 may also transmit data back to one or more of the system administrator servers, such as information regarding the consumer's response(s) to targeted advertising and promotions (e.g., whether or not particular items were added to a shopping list and/or actually purchased by the consumer).

While the systems of the present invention may include any number of system administrator servers, the exemplary embodiment shown in FIG. 1 includes a media content server 501, a program management server 502, a data feed server 503, and a consumer statistical data server 504. Each of these servers may be configured to communicate with one another and/or with household management application 40 and/or one or more retailer servers 804. By way of example, data feed server 503 may be configured to communicate directly with household management application 40 through network 400, and may include a data store containing consumers' system ID's or loyalty card identifiers and associated passwords (or other consumer identifying information). Data feed server 503 may then control the flow of data between the other system administrator servers and household management application 40.

Media content server 501 may include a data store of media content items (as further described herein) for transmission to household management application 40 and subsequent storage in media content data store 46. Media content server 501 may also include executable instructions for transmitting media content items to household management application 40, particularly upon receipt of a request from household management application 40 (e.g., an update request received from household management application 40).

Program management server 502 may include a data store and executable instructions for performing various system management functions. For example, program management server 502 may be responsible for transmitting program updates and the like to household management application 40. Program management server 502 (and/or data feed server 503) may also include diet/nutrition data, recipe data and/or product catalog data for transmission to household management application 40.

Consumer statistical data server 504 may include a data store and executable instructions for receiving data from household management application 40. By way of example, consumer statistical data server 504 may receive data identifying products added to a consumer's shopping list and/or products purchased by a consumer and/or data identifying media content items displayed to the consumer. In particular, consumer statistical data server 504 may receive data identifying products added to a consumer's shopping list and/or products purchased by a consumer after a media content item associated with such products has been displayed to the consumer.

Household management application 40 may include a purchase history module 141 comprising executable instructions for selectively displaying purchase history data in response to user instructions, as well as for receiving and storing received purchase history data in purchase history data store 41. The purchase history data received by household management application 40, in particular by purchase history module 141, may typically include the transaction date, a store identifier (e.g., a numerical store code), total transaction cost (i.e., total purchase price for the transaction) and details regarding each item purchased. The purchased item detail may include a product identification code (or other product identifier), the quantity purchased, the price for each item, and any discounts for that item (e.g., redeemed coupons). The purchased item detail may also include a detailed description of each purchased item (e.g., product brand name, size, variety such as flavor, etc.), as well as product category information. Product category information may include multiple levels of specificity. For example, a package of American cheese slices may be broadly categorized as "dairy", with a sub-category of "cheese", and a narrower sub-category of "American cheese." Exemplary top-level categories include such things as: "beverage", "market", "dairy", "frozen", "baking" "snacks", "bottle/can", "produce", "breakfast", "household", and "others".

In order to reduce the amount of shopping history data received by household management application 40 and minimize the amount of locally stored data, the received purchased item detail of the shopping history data may simply include a product identification code (e.g., the UPC code) and omit other product information such as the detailed description of each purchased item (e.g., product brand name, size, variety such as flavor, etc.), and product category information. Such omitted purchased item detail, however, may be stored in product catalog data store 47 along with the corresponding product identification codes. In this manner, purchase history module 141 may extract purchased item detail from product catalog data store 47 using the product identification codes. By way of example, purchase history module 141 may query product catalog data store 47 using a product identification code, and in return will receive additional purchased item detail (e.g., product brand name, size, variety, category, etc.) for the product having that identification code.

One feature of certain embodiments of the systems and methods of the present invention is that the consumer (i.e., a user of household management application 40) has access to their own shopping histories, which may be stored locally for rapid retrieval and use. The consumer may use this data, for example, to track spending habits, plan future shopping trips (i.e., generate shopping lists), improve nutrition, follow certain diets, monitor panty inventory, and/or plan meals—without having to manually input their purchases. When the purchase history is stored locally, these tasks (as well as others described herein) may be performed "offline"—i.e., without requiring communication to any application, server, or site which is external to the consumer's household.

Figure 2:
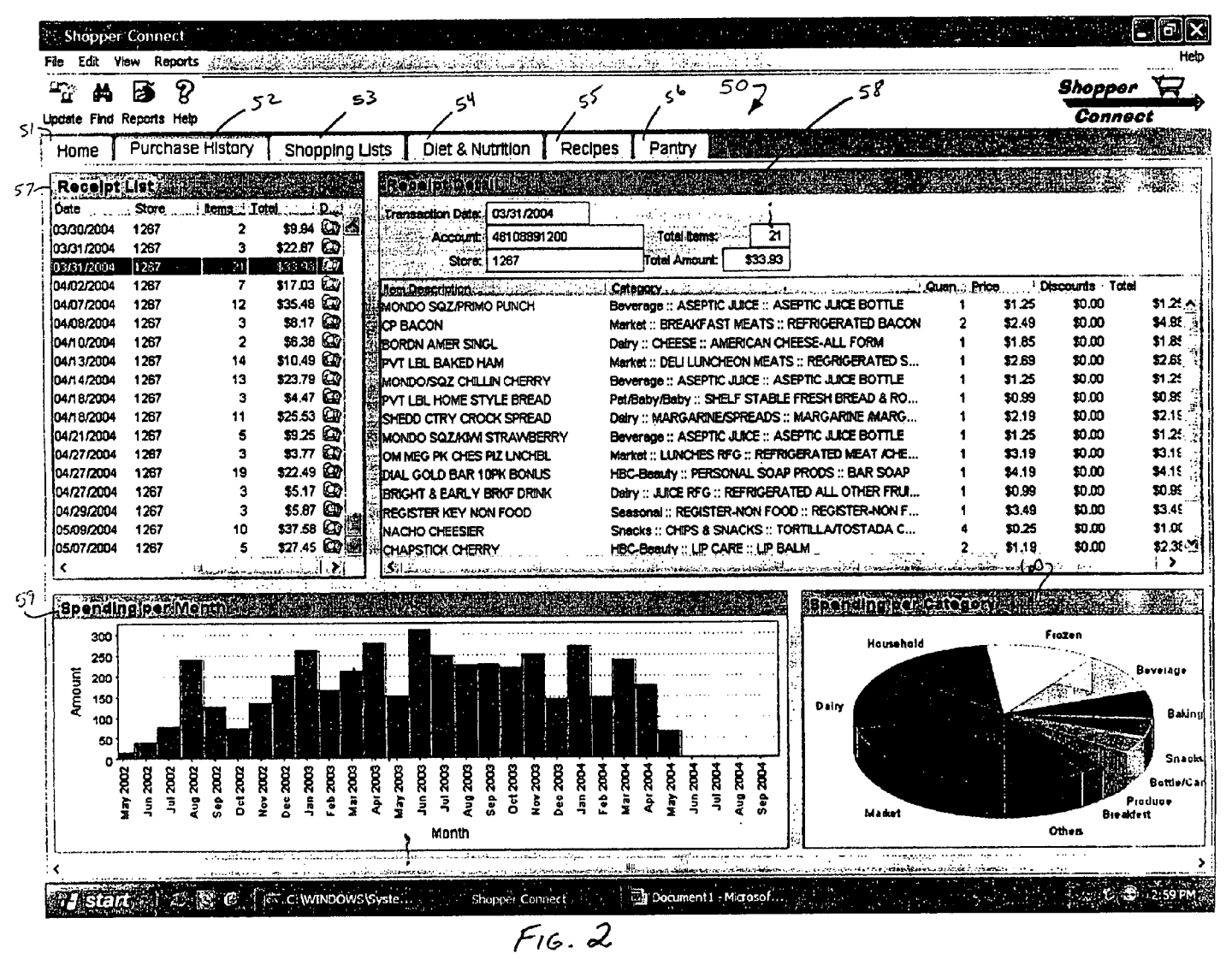

In order to facilitate the consumer's use of their purchase history, as well as the various other features and functionalities described herein, household management application 40 may include a graphical user interface (GUI). FIG. 2 depicts an exemplary GUI 50, which includes a plurality of individual screen displays corresponding to various application functionalities. In the exemplary embodiment shown, GUI 50 includes six separate screen displays which are user-selectable by a labeled tab appearing at the top of the screen display. Of course any number and variety of screen displays may be used, as GUI 50 is merely exemplary.

In the exemplary embodiment shown, the screen displays of GUI 50 include "Home" 51, "Purchase History" 52, "Shopping Lists" 53, "Diet & Nutrition" 54, "Recipes" 55 and "Pantry" 56 (wherein the reference numerals refer to the labeled tabs appearing at the top of each screen display). In FIG. 2, the purchase history screen display 52 has been selected (e.g., by pointing to the "Purchase History" tab using a pointing device such as a mouse and selecting this screen display by a mouse click or other user input). The purchase history screen display, like the other screen displays of GUI 50, may include a plurality of individual windows which may be resized, moved, and/or closed (i.e., hidden from view), and may also be scrollable as needed, in a manner known to those skilled in the art.

When the user selects purchase history screen display 52, purchase history module 141 will retrieve purchase history data from purchase history data store 41 for display on purchase history screen display 52. In the embodiment shown in FIG. 2, the displayed windows within purchase history screen display 52 include receipt list 57, receipt detail 58, spending per month 59 and spending per category 60. Receipt list window 57 displays a scrollable list of each of the consumer's transactions, including the date, store number, total number of items purchased and total transaction amount. Receipt detail window 58 displays a detailed, scrollable list of purchased items from one of the transactions selected by the user from receipt list window 57. The user may select the transaction to display simply by, for example, highlighting one of the transactions listed in receipt list window 57.

Spending per month window 59 in FIG. 2 displays monthly expenditures using the consumer's shopping history, wherein the user can select the time frame which is displayed. Spending per category window 60 displays expenditures by product category, wherein the user may one again select the time frame which is displayed. In windows 59 and 60, the data may be displayed in a variety of manners, such as various types of graphs or even a pie chart, as shown. Thus, it will be understood that the consumer may use their own purchase histories for budgeting, monitoring spending trends, reviewing spending categories, etc. In addition, purchase history module 141 may include executable instructions for displaying and manipulating the purchase history data in a variety of other manners, including extracting product details from the product catalog data store (as described previously).

Household management application 40 may also be configured to include a pantry inventory manager 145 which includes executable instructions for tracking and displaying the inventory of grocery and other household items based, at least in part, upon the consumer's shopping history. In particular, pantry inventory manager 145 may track the consumer's purchases of consumable items (such as food products and toiletries) in order to estimate the rate of household consumption of such items. For example, if the consumer purchases one gallon of milk approximately every four days, pantry inventory manager 145 will determine that the household consumes approximately one quart of milk per day.

Pantry inventory manager 145 may use consumption information to maintain an inventory (i.e., a list) of items on hand in the household, such as by storing this data in pantry inventory data store 45 (see FIG. 1). The consumer may retrieve this data at any time in order to obtain an estimate of current household inventory. It should be noted that the term "pantry inventory data store" is not intended to limit the inventory tracking feature to food items. Rather, pantry inventory manager 145 may also track the inventory of any other types of products within the household, particularly consumable products such as toiletries, pet food, certain hardware items (e.g., light bulbs), etc.

Pantry inventory manager 145 may also estimate household inventory using empirical data, either alone or in conjunction with the consumer's personal shopping histories. In particular, the consumer will generally input household demographic data into household management application 40, such as upon initial setup of the system. Such information can include, for example, household size and the age of each household member, and may be stored in a household profile data store 48. Using such information, pantry inventory manager 145 may be configured to estimate household consumption of consumable items. By way of example, if the user inputs that her household comprises three individuals, two adults and one child age 14, pantry inventory manager 145 may be configured such that it estimates household consumption of toilet paper to be one roll per week. Such empirical data may then be used by pantry inventory manager 145 to estimate the current remaining inventory of toilet paper at any given time following the purchase of a quantity of toilet paper (as retrieved from purchase history data store 41) or the manual setting of an amount of toilet paper on hand. Such inventory estimation may be particularly useful during the consumer's first few months using the system since there may be insufficient purchase history to provide an inventory estimate based upon actual historic usage by the household. Inventory estimation using empirical data and household demographics may also be useful for items which are purchased on an infrequent basis, since it may take considerable time before there is sufficient purchase history data to estimate remaining inventory based upon actual household consumption.

Pantry inventory manager 145 may also be configured to receive user input related to pantry inventory data, thus allowing the user to manually input the current inventory of various products. This feature may be particularly useful during the initial stages of use of the systems and methods of the present invention by a user when there is little or no purchase history data to establish which products are currently on hand in the household. This feature may also be useful in correcting incorrect pantry inventory data.

As further described herein, the systems and methods of the present invention may also include a recipe module 144 (along with a recipe data store 44) and a meal planning module 147. Data from recipe module 144 and/or meal planning module 147, namely data indicating recipe usage and meals consumed in following a meal plan, may be used to update the pantry inventory data for food items. For example, whenever a recipe from recipe data store 44 is used, pantry inventory manager 145 may deduct the consumed ingredients from the pantry inventory data store 45. Likewise, pantry inventory manager 145 may also update pantry inventory data store 45 in conjunction with use of meal planning module 147 in the same manner.

The systems and methods of the present invention may also include a shopping list module 142 which includes executable instructions for generating a shopping list. In this manner, household management application 40 allows the consumer to generate a shopping list at home prior to going to a retailer's store. Shopping list module 142 may be used to generate a shopping list in a variety of ways. First, the consumer may utilize their own purchase histories in order to select items to be added to their shopping list. Similarly, previous shopping lists may also be stored by the system in shopping list data store 42 such that items may be selected from one or more previous shopping lists and added to a current shopping list which the user is creating.

Items may be selected from the user's purchase histories or previous shopping lists and subsequently added to the current shopping list in a variety of manners. For example, using GUI 50 in FIG. 2, the user may simply select an item from the receipt detail window 58 and "drag" the item onto shopping list tab 53, thereby causing the item to be added to the current shopping list. Of course this technique is merely exemplary, as a variety of other user inputs may be used to select an item from the user's purchase history and/or previous shopping lists for addition to the current shopping list.

Shopping list module 142 may also be configured such that any new shopping list is pre-populated with certain items. The items which pre-populate a new shopping list may be identified by the consumer, such as by setting certain "preferences" in household management application 40. In this manner, the user may identify products which they wish to appear on every new shopping list. Whenever a new shopping list is generated, the identified items will automatically be included in that shopping list. Such items may include, for example, staple products such as milk and bread which the consumer would ordinarily purchase on every store visit, or at least those store visits for which a shopping list is prepared.

Shopping list module 142 may also be configured such that a new shopping list is pre-populated with certain items which are not specifically identified by the consumer. For example, shopping list module 142 may simply examine shopping lists which the user has previously generated, and automatically add any item which is present in a predetermined number of previously-created shopping lists (e.g., any item which appears in three of the last five shopping lists created by the user). Shopping list module 142 may perform a similar function using the consumer's purchase history such that any item appearing in a predetermined number of recent store visits is automatically added to every new shopping list generated.

Shopping list module 142 may also be configured to pre-populate a new shopping list with certain items based upon pantry inventory data store 45. For example, for any item in pantry inventory data store 45 which is indicated as being below a predetermined level, such items will be automatically added to a new shopping list by shopping list module 142. Alternatively, shopping list module 142 may determine which items in panty inventory data store 45 are likely to be fully consumed within a predetermined number of days using consumption estimates.

Similarly, and as further described herein, if the consumer selects one or more recipes or establishes a meal plan, any ingredients contained in the selected recipes or meal plan which are not identified in pantry inventory data store 45 as being on hand in a sufficient quantity will be added to the new shopping list by shopping list module 142.

Figure 3:

Shopping list module 142 may also be configured such that any pre-populated items in a shopping list may be readily removed by the user. For example, FIG. 3 depicts an exemplary shopping list display screen 53 of GUI 50 having two windows—shopping lists history window 65 and shopping list detail window 66. Shopping lists history window 65 simply displays a chronological list of shopping lists, including the creation date and a title (which may be user-defined) for each. Shopping list detail window 66 displays the details for a shopping list highlighted in the shopping list history window 65—such as a newly-created shopping list as shown in FIG. 3.

In the example shown in FIG. 3, a new shopping list (titled "New List") has been created and tentatively pre-populated by shopping list module 142 with various items in the manners described previously. The pre-populated items may include "suggestions" for the new shopping list, as shopping list module 142 may be configured to require each pre-populated item to be confirmed or selected by the user in order to be included in the final shopping list (which may be printed by the end user). The user may confirm each item, for example, by clicking the empty box to the left of each item in shopping list detail window 66.

The user may also manually add items to their shopping list, for example by using product catalog data store 47 which contains a list of all available products at one or more particular retailers. Alternatively, store catalog 47 may be maintained at a location which is remote to the user's computer 35, such as at retailer data store 802. Product catalog data store 47 may comprise one or more data stores containing product information for a retailer or a particular retailer's store. The user may search store catalog 47 by product name, product category, product sub-categories, etc. (or other fields related to consumer products and/or the overall shopping experience) and select items from it to add to the shopping list. In some instances, if media content is associated with a selected item, it may be displayed to the user when they select that item (as further detailed herein).

Once the consumer has completed their shopping list, they may simply print the shopping list (e.g., by clicking on the "print" button of GUI 50 shown in FIG. 3) and take the list with them to the store in order to guide their shopping. In some embodiments, product catalog data store 47 may include store location information for each item, such as the aisle number for each product. For each item in the shopping list, shopping list module 142 may query product catalog data store 47 in order to determine the store location for each item on the list. Shopping list module 142 may then cause the shopping list to be printed in a manner corresponding to the store location for the items. By way of example, the printed shopping list may be arranged such that products in the same store aisle are grouped together, and the aisles themselves are printed sequentially according to the layout of a particular store identified by the user. In this manner, it will be easier for the consumer to use the shopping list while at the store, since they may proceed around the store in the sequence shown on their shopping list.

In other embodiments, shopping list module 142 may be configured to transmit the final shopping list to a retail store (e.g., electronically over communications network 400) such that store personnel may pull the shopping list items prior to the consumer arriving at the store. The consumer may then simply pick up their entire shopping list of items at the store without having to pull the items from the store shelves themselves.

Embodiments of the present invention may also include a media content data store which contains advertising and promotional content which is selectively presented to a consumer based on predetermined rules and conditions. In the exemplary embodiment shown in FIG. 1, media content is stored locally in media content data store 46 of the consumer's computer 35. This arrangement is advantageous in that media content can be presented to the consumer "offline" without the need for an active communications link with a remote application or server. In addition, the predetermined rules and conditions for the selective presentation of media content may be applied locally by household management application 40, thus reducing the computing demands placed upon system administrator application 501 or other systems of the administrator or retailer. Of course it is also contemplated that the media content may be stored at a location remote from the user's personal computer 35, such as on one of the system administrator servers 501-504, and household management application 40 may be configured to receive and display selected media content received from such remote source.

As further detailed herein, household management application 40 may also be configured to record the results of media content presented to the consumer, such as whether or not a particular media content item displayed to the user resulted in an item being added to the consumer's shopping list and/or actually purchased by the consumer (per the user's purchase history). This data may then be subsequently transmitted to one of the system administrator servers 501-504, such as during a subsequent data/application update, so that the effectiveness of advertising and promotions may be evaluated. Of course it is also contemplated that the results of media content item displayed to the consumer, particularly whether or not is resulted in a product being added to the current shopping list, may be transmitted to one of the system administrator servers 501-504 following display of the media content item or completion of a current shopping list (i.e., the results of media content displays are not locally stored).

When media content is stored locally in media content data store 46, it may be hidden, encrypted, and/or otherwise made inaccessible to the consumer such that the consumer may not directly access the media content at will. By way of example, locally stored media content may be encrypted using various encryption methods known to those skilled in the art. Selected media content from media content data store 46 may be presented to the consumer by household management application 40 according to predetermined rules and conditions. In this manner, a consumer may be presented with only a small portion of the media content which is stored within media content data store 46. In addition, the media content within media content data store 46 may be updated periodically (e.g., new content added, old content deleted, rules and conditions modified, etc.), such as during system updates.

Media content stored in media content data store 46 may include any of a variety of items. For example, media content can include product advertisements and product promotions (e.g., coupons), and may take the form of text alone or text in combination with graphical elements (e.g., product images). Each item of media content may have one or more predetermined associated therewith in order to selectively target the media content based on these predetermined rules. In this manner, each item of media content is only presented to a consumer if the predetermined rules for that item have been met. If the predetermined rules are not met, the media content item will not be presented to the consumer, even though that media content item may be stored within media content data store 46. In this way, users are not confronted with options that are not relevant to their needs. Their needs may be determined, for example, by their individual purchasing patterns reflected in their shopping histories, by their declared favorites (i.e., products which the user identifies as being preferred), by their nutritional preferences, and money saving opportunities.

The predetermined rules associated with each item of media content may include any of a variety of measures. In particular, the predetermined rules may be based upon the consumer's household demographics, purchase history, shopping lists, recipes, meal plans, pantry inventory or even diet and nutrition parameters. Household management application 40 may compare the predetermined rules for each item of media content with data stored in one or more of the data stores described previously herein. By way of example, if an item of media content has one or more predetermined rules based on household demographics (e.g., households having at least one child under the age of two), household management application 40 (e.g., media content manager 146) will evaluate the stored demographic (or profile) data for the user's household in order to determine if the predetermined rules for the media content item are met. (Household demographic data may be stored in, for example, household profile data store 48, or any other data store in computer 35 or even a data store remote to the user's computer 35).

Media content rules may also be based on consumer purchase history in order to target media content to selected consumers. By way of example, an item of media content may have predetermined rules associated therewith which dictate that the item is only presented to a consumer if a particular product (e.g., a specific brand or product category) is present in their purchase history for the previous two months. By way of specific example, media content comprising a coupon for brand X ice cream may have a rule associated therewith which limits presentation of the coupon to consumers who have purchase brand Y ice cream within the previous three months. By way of further example, a manufacturer may wish to deliver advertising only to households of certain demographics (e.g., households having at least one child below a certain age) which have purchased a particular product within the past three months.

Media content rules may also be based upon shopping list information, particularly a new shopping list being created by a user. For example, an item of media content may only be presented to a consumer if a particular product is present in their current shopping list. This may be particularly useful if household management application 40 is configured to present the item of media content to the consumer while they are in the process of creating a new shopping list, since targeting advertising and promotions at this moment of time will often be most effective.

By way of example, an advertisement or promotional item such as a coupon may be used to drive the consumer to purchase a particular brand of product when either a different brand appears in their shopping list or their shopping list does not specify a particular brand of product. As a specific example, if the consumer's current shopping list merely specifies "American cheese slices" household management application 40 may present a coupon for "Brand A cheese." Similarly, if the consumer's current shopping list includes "Brand B cheese," household management application 40 may present a coupon for "Brand A cheese" in an effort to cause the consumer to switch brands.

It should also be pointed out that multiple predetermined rules may be associated with each item of media content within media content data store 46. By way of example, the rules and conditions for an item of media content may be based upon data from the consumer's purchase history as well as their pantry inventory. By way of specific example, pantry inventory data may be useful in determining whether or not a particular item of media content for a product would be effective. Presenting an advertisement or coupon for shampoo may not be effective when the pantry inventory data store indicates the consumer will not need to buy more shampoo in the near future. The consumer's purchase history alone may not be able to accurately determine when the consumer may need to purchase shampoo, since each household's rate of consumption may differ greatly. Of course the predetermined rules for a media content item also may be based solely on pantry inventory data.

As further described herein, the systems and methods of the present invention may also include a recipe and meal planning feature, as well as diet and nutrition functionality. The predetermined rules and conditions for media content items may also be based upon certain aspects of this additional functionality. For example, the predetermined rules and conditions for a media content item may dictate that the item is presented to a consumer if they select a particular recipe from recipe data store 44 or if they select a recipe which includes a particular product as an ingredient. Similarly, the predetermined rules and conditions for a media content item may dictate that the item is presented to the consumer if a particular dish or food item appears in a meal plan selected by the consumer.

With respect to diet and nutrition, as further described herein, the systems and methods of the present invention may be configured to allow the user to select one or more diet or nutritional parameters for their household. Once again the predetermined rules for a media content item may include diet and/or nutritional parameters which the user sets for their household.

Media content may be presented to the user in any of a variety of manners. For example, whenever the predetermined rules for a media content item are met, the item may be automatically displayed to the user whenever household management application 40 is in use. By way of specific example, this may occur in a "pop-up" window when household management application 40 is first started. Of course the system may also be configured such that media content items are automatically displayed when the user is creating a new shopping list such that the media content displays will not interfere with the use of other system features.

Figure 4:
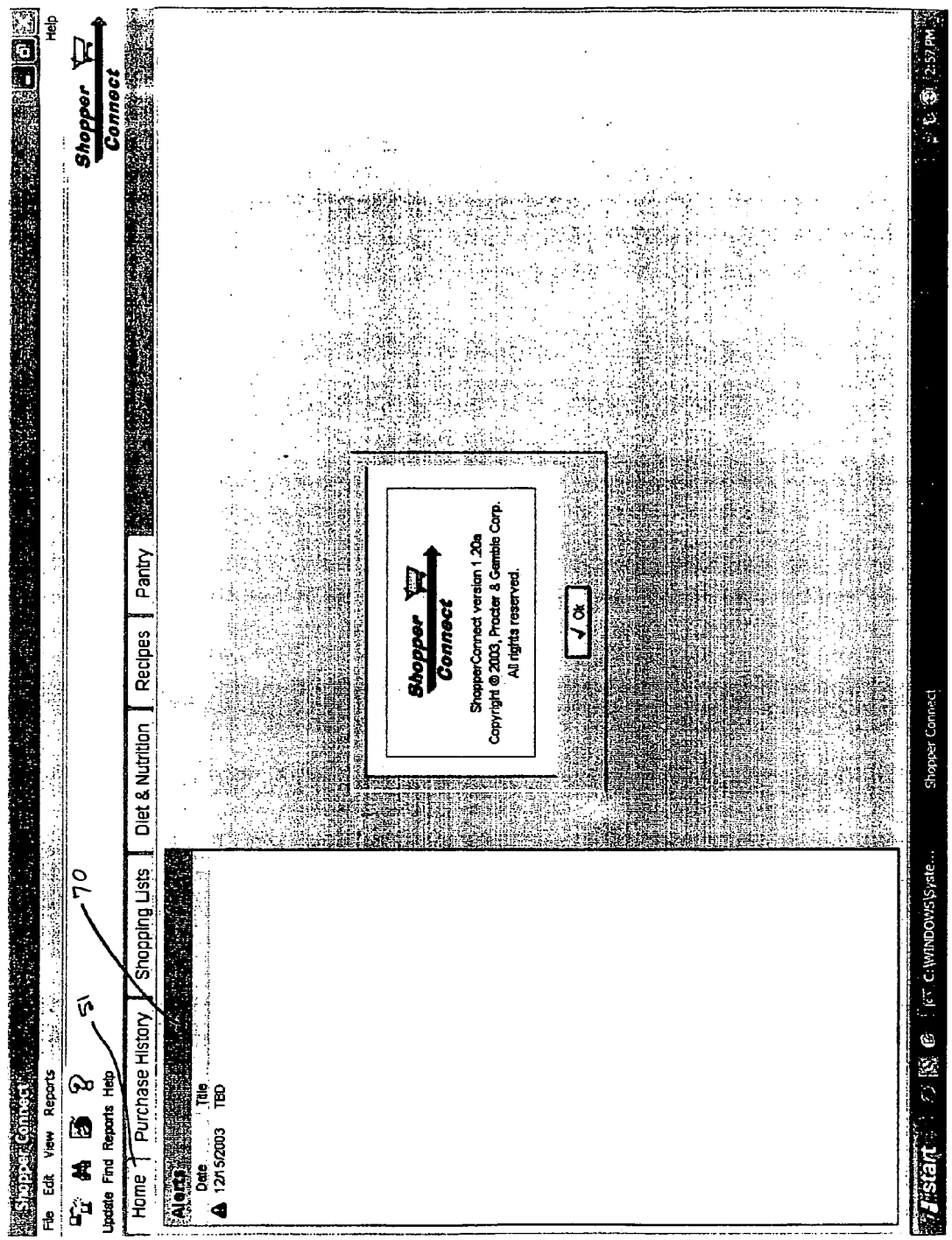

Of course media content may be presented to the user in a variety of other ways, particularly methods which may be less intrusive than pop-up windows and the like. By way of example, GUI 50 may include a separate screen display or portion of a screen display devoted to media content selected for presentation to the user. As shown in FIG. 4, home display screen 51 may include an "Alerts" window 70 which contains a list of media content items selected for presentation to the user. The user (i.e., the consumer) may then simply select items from Alerts window 70 (e.g., by performing a mouse click on a listed item) so that the selected media content item is then displayed to the user. The selected media content item may be displayed, for example, in a separate window of home display screen 51.

As yet another alternative, when the system selects media content items for presentation to the user wherein such items are associated with a product in the current shopping list, the product may be highlighted in the shopping list in order to alert the user that there are one or more media content items associated with that product. In particular, a visible indicia may be provided in shopping list window 66 (see FIG. 3) for particular products with which one or more media items is associated. Such visible indicia may comprise, for example, displaying the product name in a different color, flashing text, or even a symbol or other visible indicia adjacent the product in the shopping list. The user may then provide an input to the system indicating that they wish to view the media content item(s) associated with a particular product. This may be accomplished, for example, by performing a mouse click on the product in shopping list window 66, in order to display the media content item or to display a window (e.g., a pull-up window displayed by "right-clicking" on a product in the shopping list). The system may even by configured such that multiple media content items are presented for a single product in the current shopping list, such as alternative suggestions which the user may wish to consider.

As mentioned previously, each media content item may include text and/or graphical material (e.g., still images, video and/or animation), or even sound. Typically, each media content item will be displayed on the screen associated with computer 35, such as in a separate window or other region which is separate from other portions of GUI 50. Each media content item may further include a computer-readable address which will direct the user to an external source of additional information. The computer-readable address may comprise, for example, a hypertext link to an external website, wherein the hypertext link may be presented in active form in a window displaying the media content. In this manner, the user may simply click on the hypertext link, causing an Internet web browser to be opened with the address bar pre-coded for the link. This will allow the consumer to obtain more information related to the product or other information contained in the media content item.

Each media content item may also be displayed in a manner which facilitates user selection of the subject product for addition to their shopping list. For example, when a media content item is displayed in a window of GUI 50, this window may include a clickable button or other input device by which the user may select the displayed product for addition to their current shopping list.

The systems and methods of the present invention may also include the ability to monitor and track the results of media content items presented to a consumer. In particular, household management application 40 may collect and store data for each instance in which a media content item is presented to the user. This data may include, for example, an identifier for the media content item (e.g., an internal alphanumeric code used to identify each media content item), whether or not presentation of the media content item resulted in a product(s) being added to the users shopping list, the length of time that the media content item was displayed on the screen, and whether or not the consumer used any computer-readable link (e.g., a hypertext link to an external website) in order to obtain additional information.

Media content items may also include the ability to collect information from the consumer, such as by way of various surveys or other forms for gathering information from the user. Thus, household management application 40 may also collect and store data resulting from such surveys or forms associated with a media content item. All of this information may be stored locally in, for example, media content data store 46. Subsequently, household management application 40 may transmit such data to consumer statistical data server 504 (or any other of the system administrator servers 501-503) for storage and analysis. Alternatively, instead of storing such data locally, household management application 40 may simply transmit such data to consumer statistical data server 504 upon collection.

Consumer statistical data server 504 may be configured to store the various data received from household management application 40 for subsequent analysis. By way of example, for each media content item, consumer statistical data server 504 may store data representative of the number of times the media content item was displayed to a consumer, whether or not a product to which the media content item pertains was added to a consumer's shopping list following display (e.g., immediately following display or within a set period of time following display), and/or whether or not the subject product was actually purchased by a consumer following display (e.g., as shown by the consumer's purchase history following display). Various other data may also be stored by consumer statistical data server 504, such as certain demographic data of the consumer. Thereafter, such data may be used by participating product manufacturers and retailers in order to analyze the effectiveness of their media content.

In fact, product manufacturers and retailers wishing to participate in the systems and methods of the present invention may provide media content for delivery and display to consumers. A fee may be charged for their participation, with this fee based, at least in part, on whether or not the display of their media content item resulted in a product(s) being added to a shopping list. In this manner, the participation fee (essentially a fee for advertising on the systems of the present invention) will be based upon the success rate of each media content item (i.e., was the associated product added to a shopping list?). In contrast, many Internet advertising systems base payment on the number of users that merely view an advertisement or promotion, rather than the actual success rate. As mentioned previously, the success rate of media content (e.g., advertisements) presented using the systems and methods of the present invention is increased since media content is presented at the time the consumer is making purchasing decisions (i.e., when they are preparing their shopping list).

As also mentioned previously, the systems and methods of the present invention may include recipe and/or meal planning features. By way of example, and as shown in the screen shot of FIG. 5, GUI 50 may include a recipes display screen 55, as shown. Recipes display screen 55 may include multiple windows, such as a recipes window 75 and a recipes detail window 76. Recipes window 75 may display a list of all recipes contained within recipes data store 44, or a selected portion thereof. By way of example, household management application 40, particularly recipe module 144, may include a recipe searching function by which the user may search recipes data store 44 using a variety of parameters. The results of such searching (i.e., the "hits") may be displayed in recipes window 75.

Figure 5:
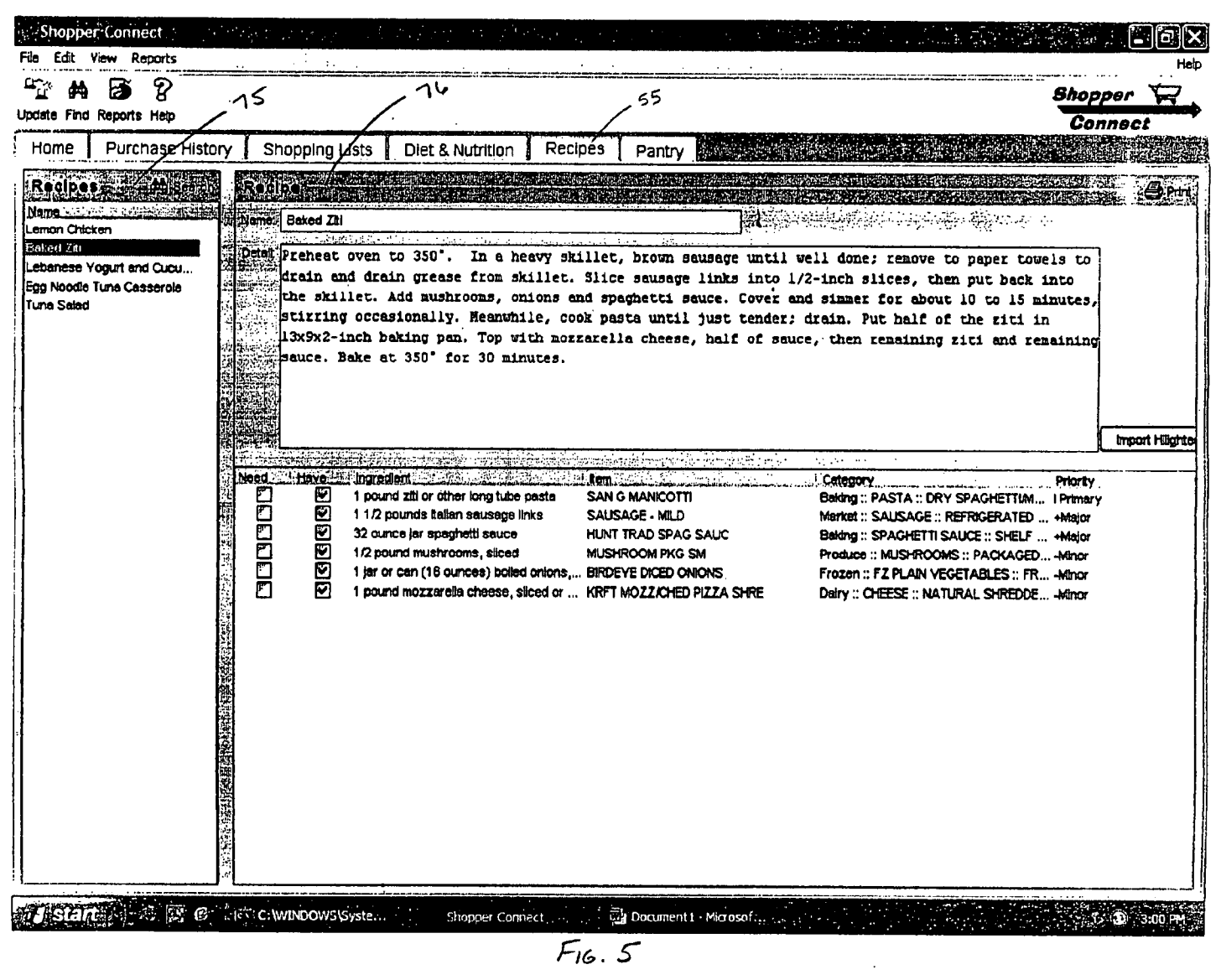

Recipes detail window 76 displays an actual recipe, such as a recipe selected by the user from the list presented in recipes window 75. In recipes detail window 76, the displayed information may include, for example, the name of the recipe, and the detailed instructions for the recipe, and a list of required ingredients. As shown in FIG. 5, the list of ingredients may also include an indication as to whether or not a particular ingredient is on hand (i.e., present in pantry inventory data store 45) in a sufficient quantity, or if the item should be added to a shopping list. The ingredients for a recipe displayed in recipes detail window 76 may even be added to the current shopping list upon receipt of a user input. Alternatively, recipe module 144 and/or shopping list module 142 may be configured such that any ingredients in a selected recipe which are not on hand in sufficient quantity are automatically added to the current shopping list. Also, recipe module 144 may also be configured to allow for the scaling of recipes—increasing or decreasing the ingredient amounts in order to allow more or less servings than indicated in each recipe. Recipe module 144 may even be configured to automatically scale each recipe to the number of servings corresponding to the number of people in the user's household or a predetermined number of servings set by the user.

As mentioned previously, the systems and methods of the present invention may also include a meal planner module 147 comprising executable instructions for allowing a user to generate a meal plan, particularly one using the recipes contained in recipe data store 44. By way of example, the user may establish a meal plan for a predetermined period of time, such as one week. The user may select recipes using, for example, recipe module 144, and then instruct meal planner module 147 to add the selected recipes to the meal plan. In particular, each recipe may be added to one or more selected days of the week when the user is generating a weekly meal plan using meal planner module 147. Meal planner module 147 may even be configured such that each recipe may be designated for a particular meal (breakfast, lunch, dinner) of the selected day.

In addition to selecting recipes for addition to a meal plan, the user may also select individual food products from pantry inventory data store 45, such as by using pantry inventory manager 145. Similarly, the user may also select individual items from product catalog data store 47, particularly food items which are not currently indicated as being on hand by pantry inventory data store 45. The user may also specify the amount of each food item or recipe present in the meal plan, such as the number of servings. Meal planner module 147 may even be configured such that any meal plan defaults to a number of servings equivalent to the members of the user's household (or a predetermined number of servings set in advance by the user).

As also mentioned previously, meal planner module 147 may be linked to pantry inventory manager 145 such that items present in the user-generated meal plan are used to adjust pantry inventory data store 45 based on consumption. In this manner, pantry inventory data store 45 will more accurately reflect actual consumption and hence current inventory of food products in the household.

Embodiments of the systems and methods of the present invention may also include diet and nutrition functionalities, particularly for facilitating compliance with various diet and nutritional needs and goals. These diet and nutritional functionalities may be provided by a diet/nutrition manager 143 which comprises executable instructions for assisting the user in complying with diet and nutritional need and goals, particularly with respect to the generation of a shopping list. In particular, diet/nutrition manager 143 may provide product suggestions in order to assist the user in complying with one or more diet or nutritional needs.

Figure 6:
Figure 7:
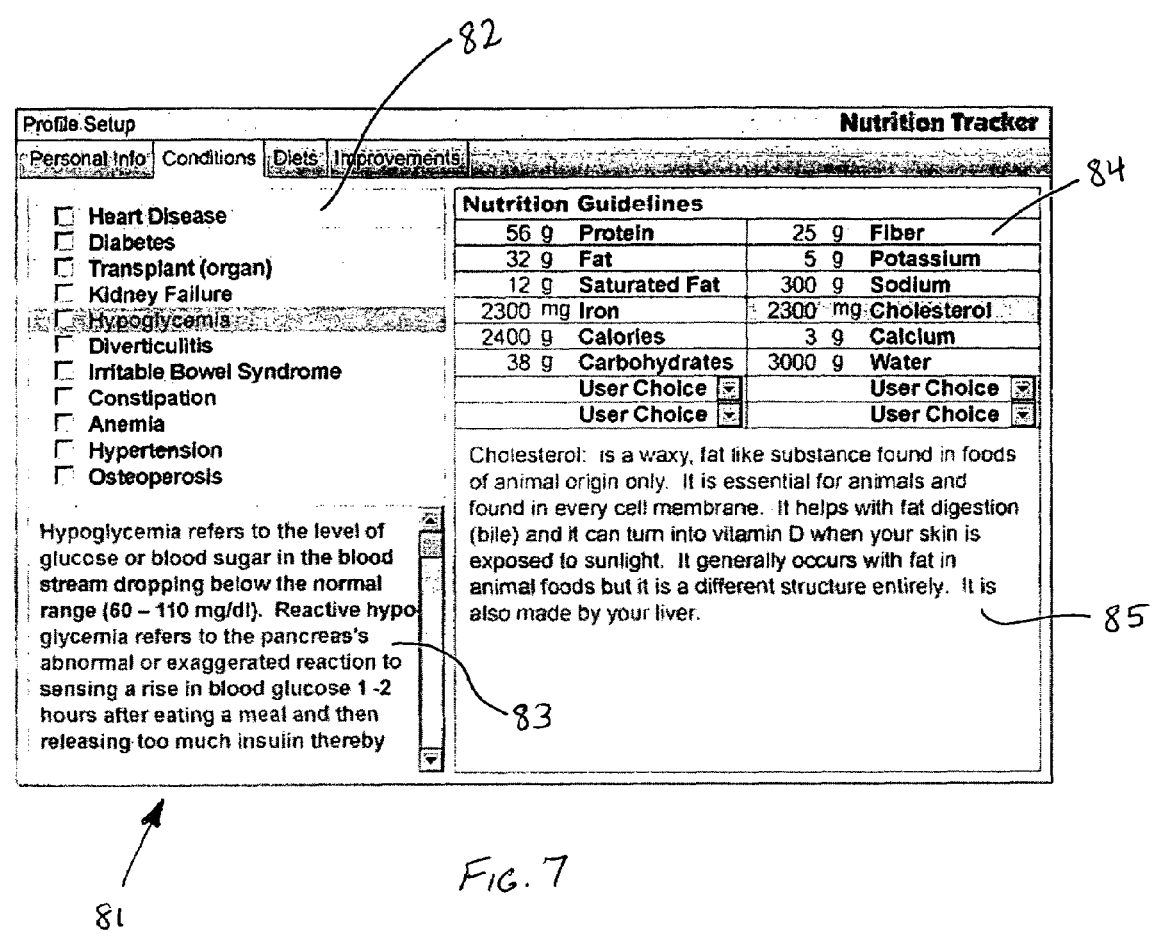
Figure 8:
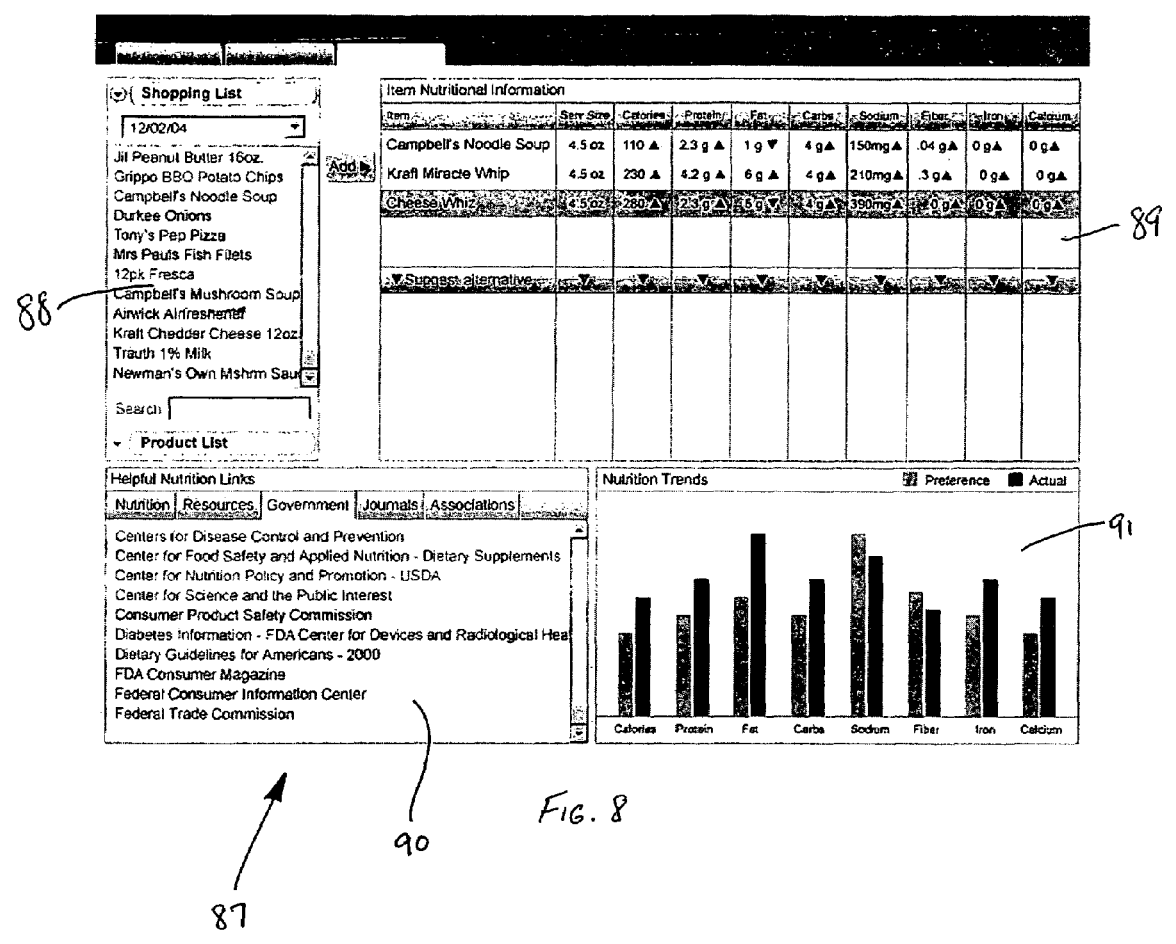

FIGS. 6-8 depict various sub-screens contained within Diet & Nutrition screen display 54 of GUI 50. In FIG. 6, the personal information sub-screen 80 is shown, which allows the user to submit personal information relevant to diet and nutritional needs. Such personal information can include the user's name, date of birth, sex, height, weight, activity level (e.g., the amount of exercise the user engages in), and/or frame size (e.g., small, average or large frame). Such personal information may even be separately input for each member of the household, such that the systems and methods of the present invention may be used to facilitate meeting the diet and nutritional needs and goals of each member of the household. The diet/nutritional personal information inputted by the user using, for example, sub-screen 80 of GUI 50 may be stored locally and need not be transmitted externally by personal computer 35 in order to ensure privacy. For example, the diet/nutritional personal information may be stored by diet/nutrition manager 143 in diet/nutrition data store 43. Diet/nutrition data store 43 may also store additional information concerning various medical conditions and diets, along with the nutritional recommendations for each, as well as other diet and nutritional information and data (including nutritional data for food products).

Once the diet/nutritional personal information has been input by the user, the user may next identify certain medical conditions for each member of the household. For example, FIG. 7 depicts medical conditions sub-screen 81 of GUI 50 by which the user may identify various medical conditions applicable to a selected member of the household. These medical conditions may include any of a variety of items, particularly medical conditions for which certain diet and nutritional needs are recommended. For example, in FIG. 7 window 82 of sub-screen 81 identifies a number of medical conditions such as heart disease, diabetes, hypertension and osteoporosis for which the medical community generally recommend certain diet and nutritional guidelines for individuals having these medical conditions. For each household member, the user may identify which of these medical conditions apply, such as by clicking on the box next to each condition in window 82. Window 83 located beneath window 82 may provide additional information regarding medical conditions selected by the user in window 82, such as by highlighting the selected medical condition. The information provided in window 83 may provide additional information and general diet and nutrition information useful for individuals suffering from the selected medical condition.

Window 84 in sub-screen 81 provides more specific nutritional guidelines for a medical condition selected by the user from window 82 (such as by highlighting the selected medical condition). The nutritional guidelines in window 84 may include the recommended daily consumption of various nutrients and other food components such as protein, fat, carbohydrates, etc. Diet/nutrition manager 143 may be configured such that the nutrition guidelines of window 84 are scaled for a particular member of the household based on, for example, that individuals height, weight, activity level and/or frame size. This is particularly useful since, for example, the recommended amount of many of the listed nutrients will vary greatly depending upon, for example, the size and weight of an individual. It should also be noted that window 84 in the exemplary embodiment of FIG. 7 includes four variable items labeled as "User Choice." These variable items may merely comprise pull-down menus by which the user may select any of a number of other nutrients or other food parameters for which guidelines are desired. Window 85 located beneath window 84 in FIG. 7 merely provides additional information regarding a nutrient or other food parameter highlighted in window 84, as shown.

Diet & nutrition screen 54 may also include a sub-screen for diets which is similar in layout to sub-screen 81 for medical conditions. Thus, for example, this diet sub-screen may include a window listing a variety of diets which may be identified for each member of the household (such as low carbohydrate diet, high protein diet, high fiber diet, etc.). Like medical conditions window 81, the diet window may also include textual information concerning any of the diets selected by the user, as well as general nutritional guidelines for the user wishing to follow one or more selected diets.

FIG. 8 depicts an exemplary embodiment for diet/nutrition improvement sub-screen 87. Sub-screen 87 may include a number of windows for facilitating user input and the display of various diet and nutritional related information. For example, window 88 displays a shopping list selected by the user from shopping list data store 42. Thus, the top of window 88 includes an identification of the shopping list (the date the shopping list was created) followed by a list of each product contained in that shopping list. A search box is also provided by which the user may search for a product contained in a shopping list in shopping list data store 42. Window 88 may also provide similar functionality with respect to product catalog data store 47 such that the user may select one or more items from product catalog data store 47 for diet and nutritional assistance.

Sub-screen 87 may also include an item nutritional window 89 which displays nutritional information for products selected from a shopping list in window 88, or even individual products selected from product catalog data store 47. By way of example, the user may simply highlight a product contained within the shopping list in window 88 and click on the "add" button such that the product is added to window 89. In window 89, nutritional information for each of the products selected by the user is displayed. Window 89 may also display suggested alternative products for each of the products selected by the user from a shopping list or product catalog data store 47. Diet/nutrition manager 143 will analyze the medical conditions and/or desired diets selected by the user, along with the diet/nutrition personal information input by the user, in order to determine the appropriate nutritional parameters based on the medical conditions and desired diets. Thereafter, diet/nutrition manager 143 will compare the nutritional parameters of items selected by the user (i.e., the items appearing in the upper portion of window 89), and compare the nutritional parameters of those items with the nutritional parameters of equivalent products found within product catalog data store 47. Equivalent products may be determined, for example, by locating items in product catalog data store 47 having the same categories and sub-categories of the user-selected items. The suggested alternatives which better comply with the medical conditions and diets identified by the user, if any, will be displayed in the lower half of window 89 as suggested alternative products. Once again, window 89 of GUI 50 may be configured such that the user may easily add any suggested alternative product to the current shopping list by providing an appropriate user input.

Sub-screen 87 may also include one or more additional diet and nutritional related windows. For example, as shown in FIG. 8, such additional windows may include a nutrition links window 90 which provides hypertext links to various websites providing additional diet and nutritional information. Window 91 displays a nutrition trends graph. The nutrition trends graph displays the user's consumption of various nutrients (based upon, for example, purchase history, meal plans or other system data), as well as the desired nutrient consumption based upon the user-selected medical conditions and desired diets. In this manner, the user may track diet and nutritional compliance.

It will be apparent that embodiments of the present invention provide numerous technical effects. For example, storing media content locally on the end-user's PC will significantly reduce the demands on the system administrator servers. Likewise, in the embodiments wherein a product catalog data store is stored locally on the end-user's PC, the end-user will not need to access system administrator servers or retailer servers in order to, for example, browse the product catalog data store and select items therefrom for inclusion in a shopping list. Additional technical effects provided by embodiments of the present invention include the ability of manufacturers and/or retailers to more efficiently and effectively evaluate the success of their promotional activities. Embodiments of the present invention also facilitate household compliance with diet and/or nutritional needs, the efficient tracking of pantry inventory, household budgeting and tracking of purchases, and the preparation of a shopping list prior to traveling to a retailer. For the end-user, many of the functionalities of embodiments of the present invention described herein may be performed offline since much of the required data may be stored locally. This will significantly reduce the need for the consumer's PC to communicate with one or more external servers. In essence, certain embodiments of the present invention allow the household management system to operate locally, particularly once the purchase history data, media content, and other data described herein has been stored locally. Of course it should be pointed out that the embodiments of the present invention do not necessarily provide each and everyone of the aforementioned technical effects.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claim is:

1. A household management system, comprising:
   (a) a user interface configured for receiving user instructions;
   (b) a media content data store containing a plurality of media content items and at least one rule associated with each media content item;
   (c) a purchase history data store containing purchase history data identifying past purchases of a system user;
   (d) a media content manager in communication with said user interface and said media content data store, said media content manager comprising executable instructions for selecting at least one of said media content items for presentation to a user based on said rules;
   (e) a purchase history module in communication with said user interface and said purchase history data store, said purchase history module comprising executable instructions for selectively displaying purchase history data in response to user instructions input using said user interface;
   wherein said media content data store and said purchase history data store are provided on a personal computer;
   (f) a product catalog data store containing product information for products available for purchase from at least one retailer;
   (g) a shopping list module comprising executable instructions for generating a shopping list comprising a list of products for later purchase, said shopping list module in communication with said user interface and said product catalog data store;
   (h) a pantry inventory data store containing data identifying the current inventory of one or more products in a user's household; and
   (i) a pantry inventory manager in communication with said pantry inventory data store and said purchase history data store, said pantry inventory manager comprising executable instructions for updating said pantry inventor data store based on said purchase history data.

2. The system of claim 1, further comprising a recipe data store containing a plurality of recipes, and a recipe module in communication with said user interface and said recipe data store, said recipe module comprising executable instructions for selecting at least one recipe from said recipe data store in response to user input.

3. The system of claim 2, further comprising a meal planning module in communication with said user interface, said pantry inventory data store, and said recipe data store, said meal planning module comprising executable instructions for generating a meal plan based on said inventory data and said recipes.

4. The system of claim 3, further comprising a diet/nutrition manager in communication with said user interface and said product catalog data store, said diet/nutrition manager comprising executable instructions for recommending products to a user based on diet/nutrition parameters selected by a user.

5. The system of claim 4, further comprising stored household demographic data, and wherein said media content manager comprises executable instructions for selecting at least one of said media content items for presentation to a user further based on at least one of: household demographic data, purchase history data, pantry inventory data, a shopping list, a selected recipe, a meal plan and a diet/nutrition parameter.

6. The system of claim 1, further comprising a diet/nutrition manager in communication with said user interface and said product catalog data store, said diet/nutrition manager comprising executable instructions for recommending products to a user based on one or more diet/nutrition parameters selected by a user.

7. The system of claim 1, wherein said system is configured for receiving purchase history data from a remote server and storing received purchase history data in said purchase history data store.

8. The system of claim 1, wherein said system is configured to transmit to a remote server data indicative of media content items presented to a user.

9. A method of selectively displaying media content to a consumer, comprising:
   (a) receiving media content data from a remote computer over a computer network and storing said media content data on a personal computer, said media content data stored on the personal computer including a plurality of media content items and at least one rule associated with each media content item;
   (b) selecting one of said media content items stored on the personal computer based on said rules; wherein said selecting step comprises comparing said rules to household data, said household data comprising at least one of: household demographic data, purchase history data, pantry inventory data, a shopping list, a selected recipe, a meal plan and a diet/nutrition parameter;
   displaying said selected media content item to the consumer on a display device associated with said personal computer;
   (f) receiving purchase history data identifying past purchases of the consumer from a remote computer over a computer network;
   (g) storing said purchase history data on said personal computer;
   wherein said selecting step further comprises comparing said rules to said purchase history data;
   (h) providing a pantry inventory data store containing data identifying the current inventory of one or more product's in the consumer's household; and
   (i) updating said pantry inventory data store on the basis of said purchase history data.

10. The method of claim 9, wherein said selecting step comprises comparing said rules to household data stored on said personal computer.

11. The method of claim 9, further comprising the step of generating a shopping list containing at least one product for later purchase by the consumer.

12. The method of claim 11, wherein each of said media content items comprises information related to a product available for purchase by the consumer, and further comprising the steps of:
   after said step of displaying a selected media content item, receiving an instruction input into said personal computer to add to said shopping list the product to which the displayed media content item is related; and transmitting to a remote server data indicating that the product to which the displayed media content item is related was added to said shopping list.

13. A computer-implemented method of populating a shopping list comprising a list of a plurality of products for later purchase by a user, said method comprising:
   (a) providing a purchase history data store containing purchase history data identifying past purchases of a user;
   (b) providing a product catalog data store containing product information for products available for purchase from at least one retailer;
   (c) providing a pantry inventory data store containing data identifying the current inventory of one or more products in the user's household;
   (d) creating a new shopping list in response to user input;
   (e) populating said new shopping list with one or more products selected on the basis of at least one of said purchase history data and said pantry inventory data;
   (f) receiving user input identifying one or more products selected from said product catalog data store by the user; and
   (g) populating said new shopping list with said one or more products selected by the user.

14. The method of claim 13, further comprising the steps of:
   providing a recipe data store containing a plurality of recipes;
   receiving user input identifying at least one recipe selected by the user from said recipe data store; and
   populating said new shopping list with said one or more products comprising ingredients of a selected recipe which are not identified in said pantry inventory data store in sufficient quantity for preparation of said selected recipe.

15. The method of claim 13, further comprising the steps of:
   providing a shopping list data store containing one or more shopping lists previously-created shopping lists;
   receiving user input identifying at least one product selected by the user from a previously-created shopping list; and
   populating said new shopping list with said at least one product selected from a previously-created shopping list.

16. The method of claim 13, further comprising the steps of:
   receiving user input identifying one or more diet/nutritional parameters selected by the user;
   selecting at least one alternative product for a product in said new shopping list on the basis of said at least one diet/nutritional parameters, said alternative product selected from said product catalog data store; and
   displaying said selected alternative product to the user.

17. The method of claim 16, wherein said product catalog data store includes nutritional information for products included therein, and said selecting step comprises:

comparing nutritional information for a product in said new shopping list and one or more alternative products in said product catalog data store to said at least one diet/nutritional parameters in order to identify at least one alternative product which better satisfies said at least one diet/nutritional parameters than the product in the new shopping list.

18. A household management system, comprising:
   (a) a product catalog data store containing product information for products available for purchase from at least one retailer;
   (b) a media content data store containing a plurality of media content items, said media content items associated with one or more products for which product information is contained in said product catalog data store;
   (c) a diet/nutrition manager in communication with said product catalog data store, said diet/nutrition manager comprising executable instructions for recommending products from said product catalog data store to a user based on one or more diet/nutrition parameters selected by a user; and
   (d) a media content manager in communication said media content data store, said media content manager comprising executable instructions for selecting at least one of said media content items for presentation to a user based on products recommended by said diet/nutrition manager.

19. The household management system of claim 18, further comprising:
   a purchase history data store containing purchase history data identifying past purchases of a system user;
   a pantry inventory data store containing pantry inventory data identifying the current inventory of one or more products in a user's household; and
   a pantry inventory manager in communication with said pantry inventory data store and said purchase history data store, said pantry inventory manager comprising executable instructions for updating said pantry inventory data store based on said purchase history data;
   wherein said media content manager comprises executable instructions for selecting at least one of said media content items for presentation to a user based on products recommended by said diet/nutrition manager and said pantry inventory data.

20. The household management system of claim 19, further comprising:
   a shopping list module comprising executable instructions for generating a shopping list comprising a list of products for later purchase from said at least one retailer, said shopping list module in communication with said product catalog data store, said purchase history data store, said diet/nutrition manager, and said pantry inventory data store.

* * * * *

UNITED STATES PATENT AND TRADEMARK OFFICE
CERTIFICATE OF CORRECTION

PATENT NO. : 7,249,708 B2  Page 1 of 1
APPLICATION NO. : 11/051951
DATED : July 31, 2007
INVENTOR(S) : Theodore Van Fossen McConnell et al.

It is certified that error appears in the above-identified patent and that said Letters Patent is hereby corrected as shown below:

Cover Page

In the list of inventors, delete "Thoedore" and insert --Theodore--.

Column 23

Line 49, delete "inventor" and insert --inventory--.

Column 24

Line 38, in front of the phrase "displaying said selected" insert --(c)--.

Line 41, delete "(f)" and insert --(d)--.

Line 44, delete "(g)" and insert --(e)--.

Line 48, delete "(h)" and insert --(f)--.

Line 51, delete "(i)" and insert --(g)--.

Signed and Sealed this

Second Day of September, 2008

JON W. DUDAS
*Director of the United States Patent and Trademark Office*